United States Patent
Byun et al.

(10) Patent No.: US 9,516,138 B2
(45) Date of Patent: Dec. 6, 2016

(54) METHOD AND APPARATUS TO PROCESS INTEREST MESSAGES AND DATA MESSAGES BASED ON PRIORITIES IN CONTENT-CENTRIC NETWORK (CCN)

(71) Applicant: SAMSUNG ELECTRONICS CO., LTD., Suwon-si (KR)

(72) Inventors: Do Jun Byun, Seoul (KR); Byoung Joon Lee, Seongnam-si (KR); Myeong Wuk Jang, Hwaseong-si (KR)

(73) Assignee: Samsng Electronics Co., Ltd., Suwon-si (KR)

( * ) Notice: Subject to any disclaimer, the term of this patent is extended or adjusted under 35 U.S.C. 154(b) by 496 days.

(21) Appl. No.: 13/722,536

(22) Filed: Dec. 20, 2012

(65) Prior Publication Data

US 2013/0166668 A1  Jun. 27, 2013

(30) Foreign Application Priority Data

Dec. 21, 2011  (KR) .................. 10-2011-0139157

(51) Int. Cl.
*H04L 29/08*  (2006.01)

(52) U.S. Cl.
CPC ............................. *H04L 67/322* (2013.01)

(58) Field of Classification Search
CPC combination set(s) only.
See application file for complete search history.

(56) References Cited

U.S. PATENT DOCUMENTS

| | | | |
|---|---|---|---|
| 8,867,426 B2* | 10/2014 | Chun et al. ................... | 370/312 |
| 2004/0047594 A1* | 3/2004 | Towler ................... | G06T 9/007 |
| | | | 386/330 |
| 2004/0104808 A1* | 6/2004 | Khoshbin ............... | G06Q 20/04 |
| | | | 340/7.5 |
| 2009/0285209 A1* | 11/2009 | Stewart et al. ............... | 370/389 |
| 2009/0287835 A1* | 11/2009 | Jacobson ...................... | 709/229 |
| 2009/0288163 A1* | 11/2009 | Jacobson et al. .............. | 726/22 |
| 2010/0195655 A1* | 8/2010 | Jacobson et al. ............. | 370/392 |
| 2013/0039250 A1* | 2/2013 | Hsu .............................. | 370/312 |

\* cited by examiner

*Primary Examiner* — Saket K Daftuar
(74) *Attorney, Agent, or Firm* — NSIP Law

(57) ABSTRACT

A method and apparatus to process interest messages and data messages based on priorities in a Content-Centric Network (CCN) are provided. The method and apparatus to process interest messages and data messages based on priorities in a CCN provides different Quality of Service (QoS) based on type of contents by extracting a traffic type of each of the contents.

19 Claims, 12 Drawing Sheets

METHOD AND APPARATUS TO PROCESS INTEREST MESSAGES AND DATA MESSAGES BASED ON PRIORITIES IN CONTENT-CENTRIC NETWORK (CCN)

CROSS-REFERENCE TO RELATED APPLICATION(S)

This application claims the benefit under 35 U.S.C. §119 (a) of Korean Patent Application No. 10-2011-0139157, filed on Dec. 21, 2011, in the Korean Intellectual Property Office, the entire disclosure of which is incorporated herein by reference for all purposes.

BACKGROUND

1. Field

The following description relates to a method and apparatus to process interest messages and data messages based on priorities in a Content-Centric Network (CCN).

2. Description of Related Art

In a name-based network, a content request packet, namely an interest, includes a hierarchical name of content desired to be fetched. For example, when a content request packet is received, nodes included in the name-based network may transfer the received content request packet to an interface in a direction in which a node with content corresponding to a content name included in the content request packet is located. The node with the received content request packet may search for the content based on the content name. The node may transfer the content to an interface through which the content request packet enters, so that the content may be transferred to a node that requested the content.

However, to provide higher quality, content needs to be processed based on a traffic type of the content.

SUMMARY

In accordance with an illustrative example, a method processes interest messages in a content-centric network (CCN). The method includes receiving the interest messages requesting contents. The method extracts a traffic type from each content. Each content corresponds to the interest messages, and determines priorities of the interest messages based on the traffic type. The method includes processing the interest messages based on the priorities of the interest messages.

The method extracts the traffic type from each content based on a content name of each content.

The processing includes processing the interest messages in the priority queues based on the priorities of the interest messages and prior to caching the contents in a content store.

The extracting includes extracting the traffic type from each content using a classifier in the content name.

The method further includes configuring the classifier to comprise at least one of a classifier for control data, a classifier for user data, a file extender, and a file service keyword.

The method also includes determining whether the contents corresponding to the interest messages are cached in the content store.

When the contents are determined to be cached, the method includes generating data messages using the cached contents, the data messages responding to the interest messages, extracting the traffic type from each content based on the content name of each content, wherein each content corresponds to the data messages, determining priorities of the data messages based on the traffic type, and processing the data messages in priority queues based on the priorities of the data messages.

The extracting includes extracting the traffic type from each content using a classifier included in the content name of each of the contents.

The method further includes when the contents are determined not to be cached, forwarding the interest messages to a forwarding information base (FIB), wherein the FIB is configured to store an entry associated with the contents. The extracting includes extracting the traffic type from each content based on the content name of each content, when the forwarding of the interest messages to the FIB is terminated.

The extracting includes extracting the traffic type from each content using a classifier in the content name of each content corresponding to the interest messages forwarded to the FIB.

In accordance with an alternative illustrative example, a method to process data messages in a content-centric network (CCN) includes receiving data messages responding to interest messages requesting contents, and extracting a traffic type from each content. Each content corresponds to the data messages. The method includes determining priorities of the data messages based on the traffic type, and processing the data messages based on the priorities of the data messages.

The method extracts the traffic type from each content based on a content name of each content.

The processing includes processing the data messages prior to forwarding the data messages to a pending interest table (PIT), wherein the PIT is used to look up a route in a reverse direction.

The extracting includes extracting the traffic type from each content after the data messages are forwarded to the PIT.

The extracting includes extracting the traffic type from each content using a classifier included in the content name.

The method also includes configuring the classifier to comprise at least one of a classifier for control data, a classifier for user data, a file extender, and a file service keyword.

In accordance with a further illustrative example, a non-transitory computer readable recording medium storing a program to cause a computer to implement the method described above.

In accordance with an illustrative example, an apparatus to process interest messages in a content-centric network (CCN). The apparatus includes a communication interface configured to receive the interest messages requesting contents. The apparatus includes a processor configured to extract a traffic type from each content. Each content corresponds to the interest messages, to determine priorities of the interest messages based on the traffic type, and to process the interest messages based on the priorities of the interest messages.

The processor extracts the traffic type from each content based on a content name of each content.

The processor is further configured to process the interest messages in the priority queues based on the priorities of the interest messages and prior to caching the contents in a memory.

The processor is further configured to extract the traffic type from each content using a classifier in the content name.

The classifier includes at least one of a classifier for control data, a classifier for user data, a file extender, and a file service keyword.

The processor is further configured to determine whether the contents corresponding to the interest messages are cached in a memory.

The contents are determined to be cached, the processor is further configured to generate data messages using the cached contents, wherein the data messages respond to the interest messages, extract the traffic type from each content based on the content name of each content, wherein each content corresponds to the data messages, determine priorities of the data messages based on the traffic type, and process the data messages in priority queues based on the priorities of the data messages.

The processor extracts the traffic type from each content using a classifier included in the content name of each of the contents.

When the contents are determined not to be cached, the processor is further configured to forward the interest messages to a forwarding information base (FIB). The FIB is configured to store an entry associated with the contents. The processor is further configured to extract the traffic type from each content based on the content name of each content, when the forwarding of the interest messages to the FIB is terminated.

The processor is further configured to extract the traffic type from each content using a classifier in the content name of each content corresponding to the interest messages forwarded to the FIB.

Other features and aspects will be apparent from the following detailed description, the drawings, and the claims.

Figure 1:
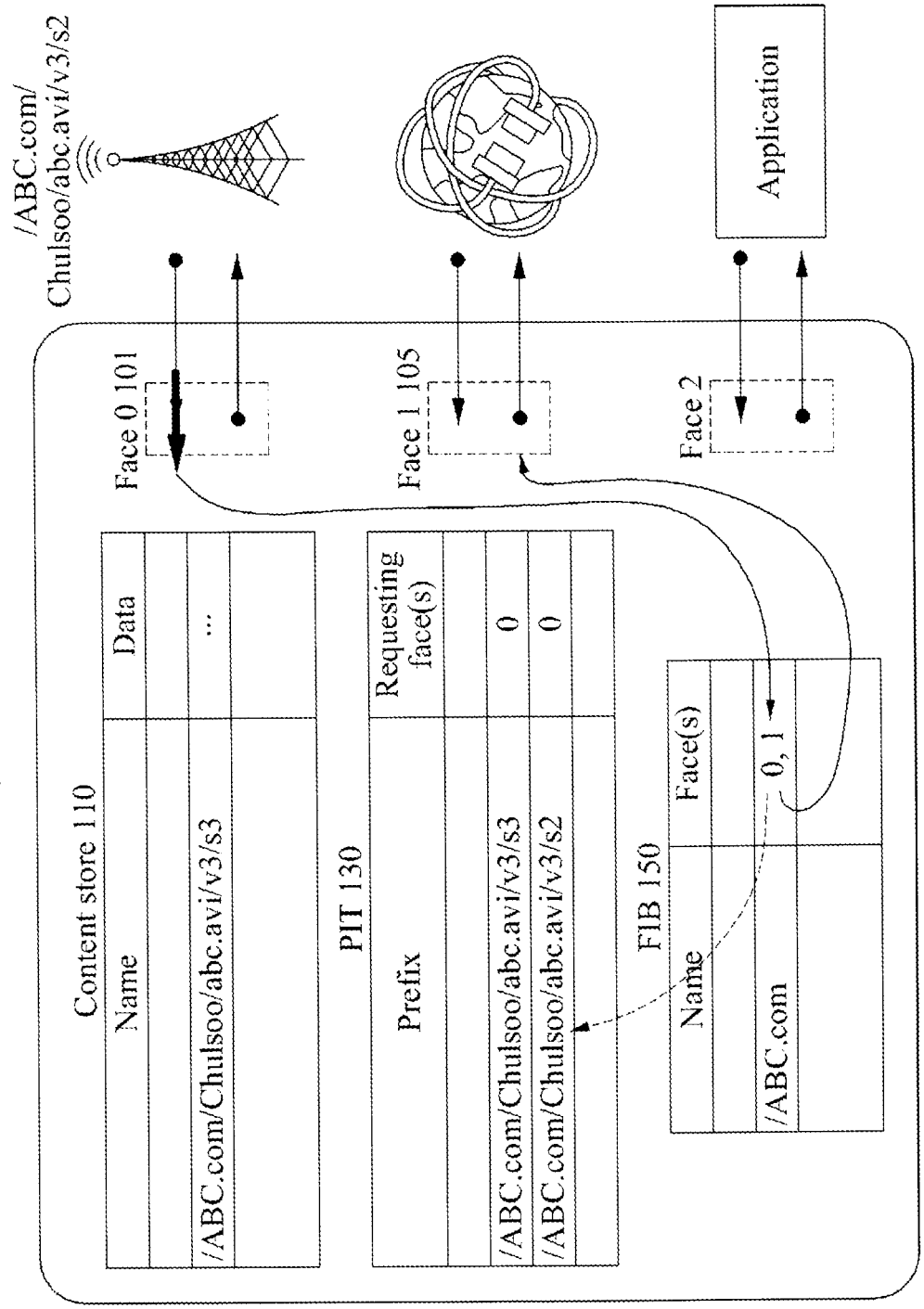
FIG. 1 is a diagram illustrating an example of an operation of processing a content request packet in a general Content-Centric Network (CCN).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of an operation of processing a content request packet in a general Content-Centric Network (CCN).

In the CCN, a name of a content may function as a compass to search for a node in which the content is stored, and function to distinguish the content from another content. Accordingly, each of the contents may be distinguished or identified using a unique name, different from the names of the other contents. When the names of two contents are different from each other, the two contents may be determined to be different contents, although the same information may be included in the two contents. For example, when two files contain the same information, but have different names, for instance, '/ABC.com/sait/video/intro.avi,' and '/ABC.com/sait/comm/video/intro.avi,' the two files may be processed as different contents. The above rule may be very useful in distinguishing different contents with similar names.

FIG. 1 illustrates an operation to process a content request packet in a CCN, for example, a name-based network, to describe an operation of fetching a content based on a hierarchical name of the content.

In this example, based on '/ABC.com/Chulsoo/abc.avi/v3/s2,' a networking module of the node determines whether the requested content is included in a content store 110 of the node.' ' When the content is determined to be stored in the content store 110, the node returns the content to face 0 101 from which the interest packet is received. In accordance with an illustrative example, the term 'face' may be used interchangeably with an 'interface.'

In another example, when the content is determined not to be stored in the content store 110, the node determines whether an entry stored with '/ABC.com/Chulsoo/abc.avi/v3/s2' is included in a Pending Interest Table (PIT) 130. When the entry is determined to be included in the PIT 130, the node adds information associated with face 0 101 to the entry in the PIT 130. When the entry is determined not to be included in the PIT 130, the node searches for the entry by performing a lookup based on the content name in a Forwarding Information Base (FIB) 150. In one example, the node searches for the entry based on longest-prefix-matching. Subsequently, the node selects face 1 105, to which the interest packet is to be transferred, based on information registered in the FIB 150. The node transmits the interest packet to the selected face 1 105. In this example, the node may register in the PIT 130, information '0' regarding face 0 101 to enable a data packet, which includes a content corresponding to the interest packet, to be transferred to a node requesting the content. Additionally, one of faces, other than face 0 101, may be selected based on the FIB 150 as a face to which the interest packet is to be transferred.

In an example, when an original name of a content is used after a hierarchical name of the content is changed, it is difficult to transfer a content request packet to a node containing the content because of an inconsistency between an FIB including the changed hierarchical name and the content name included in the content request packet. In another example, when a part of a hierarchical name of a content is changed, a content request packet may be transferred to a node containing the content. However, it may be difficult to find the content because the name may be used when generating a content.

Figure 2:
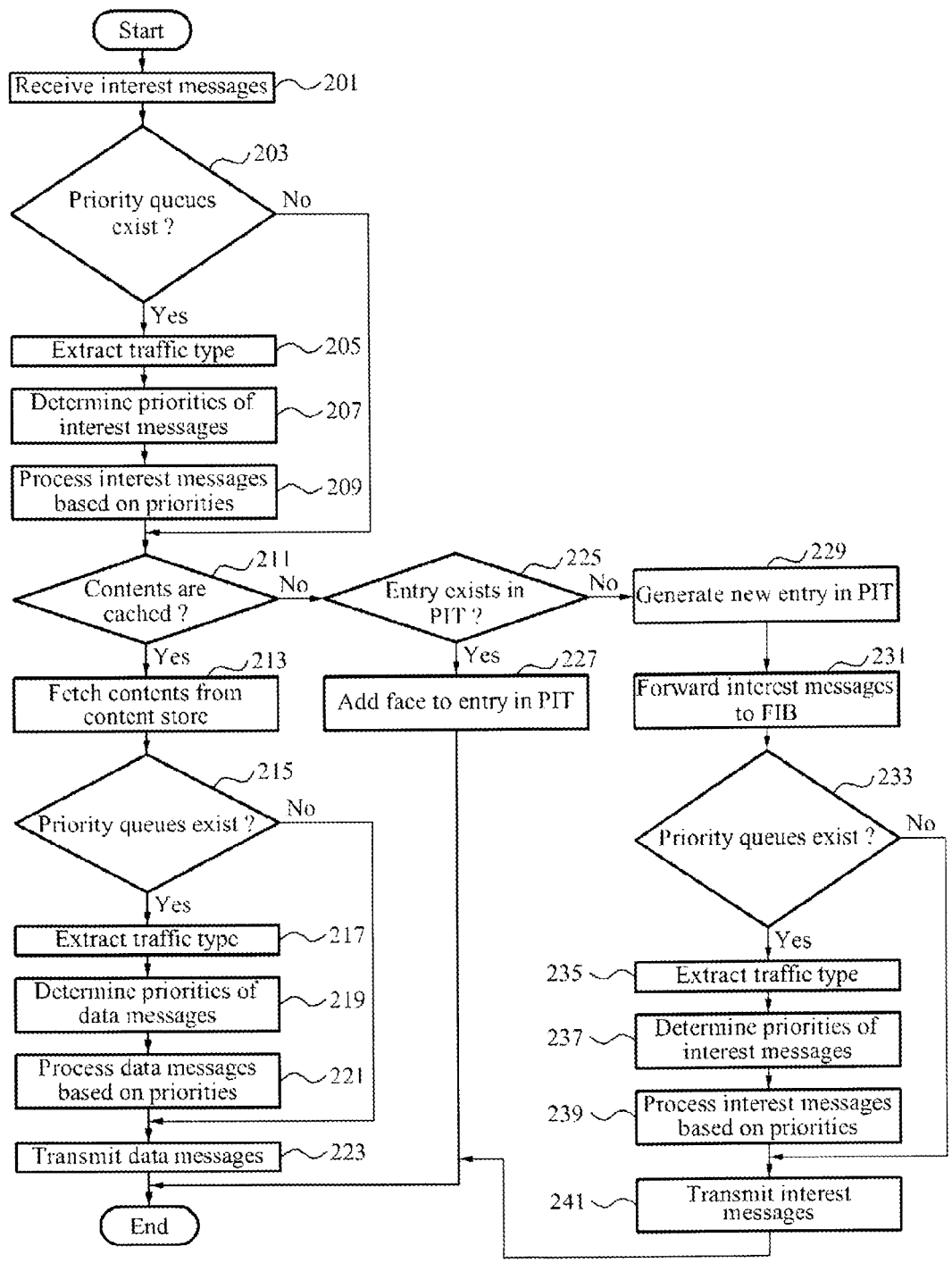
FIG. 2 is a flowchart illustrating an example of a method of processing interest messages based on priorities in a CCN.

FIG. 2 illustrates an example of a method to process interest messages based on priorities in a CCN.

In 201, the method performed at a node included in the CCN receives a plurality of interest messages to request contents. In one illustrative example, an interest message refers to a content request message or an interest, and a data message refers to a content response message.

In 203, the method performed at the node determines whether priority queues used to prioritize the received interest messages exist. For example, in 203, when the priority queues are determined not to exist, in 211, the method performed at the node determines existence or nonexistence of cached contents in a content stored.

In 205, the method performed at the node extracts a traffic type of each of the contents that correspond to the interest messages, based on a content name of each of the contents. Further, the method performed at the node extracts the traffic type of each of the contents using a classifier that may be included in the content name. The classifier may include at least one classifier for control data (for example, <control command marker>), a classifier for user data (for example, <voice>), a filer extender (for example, document (doc), PowerPoint (PPT), Joint Photographic Experts Group (JPEG or JPG), Moving Picture Experts Group (MPEG), and similar or alternative extenders), and a file service keyword (for example, a Session Initiation Protocol (SIP), and similar or alternative protocols). In accordance with a pre-defined naming convention, control data may have a name, for example, '/ccn/<domain1>/<control command marker>/domainInfo.' Additionally, user data may have a name, for example, '/ccn/<domain1>/<voice>/CCN.x . . . .' Accordingly, a combination of the previously mentioned classifiers may be used to determine priorities of the interest messages.

In 207, the method performed at the node determines the priorities of the interest messages based on the traffic type. The traffic type may include, for example, time-critical traffic, best-effort traffic, and similar or alternative types of traffics. When the priorities of the interest messages are determined in 207, the interest messages are stored in corresponding priority queues based on the determined priorities.

Figure 3:
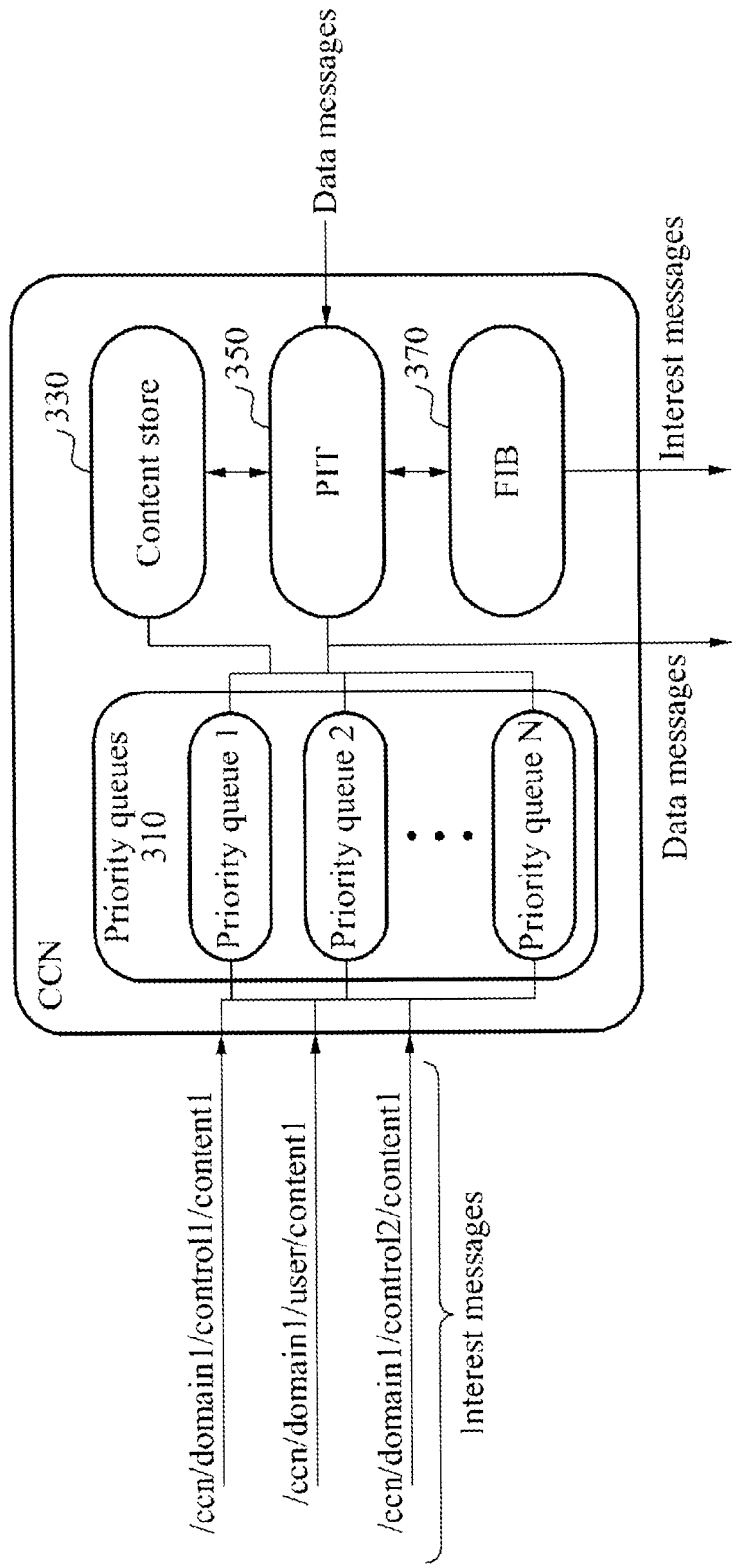
FIG. 3 is a diagram illustrating an example in which priority queues, which are located within a node of a CCN, receive interest messages before a content store receives the interest messages.
Figure 4:
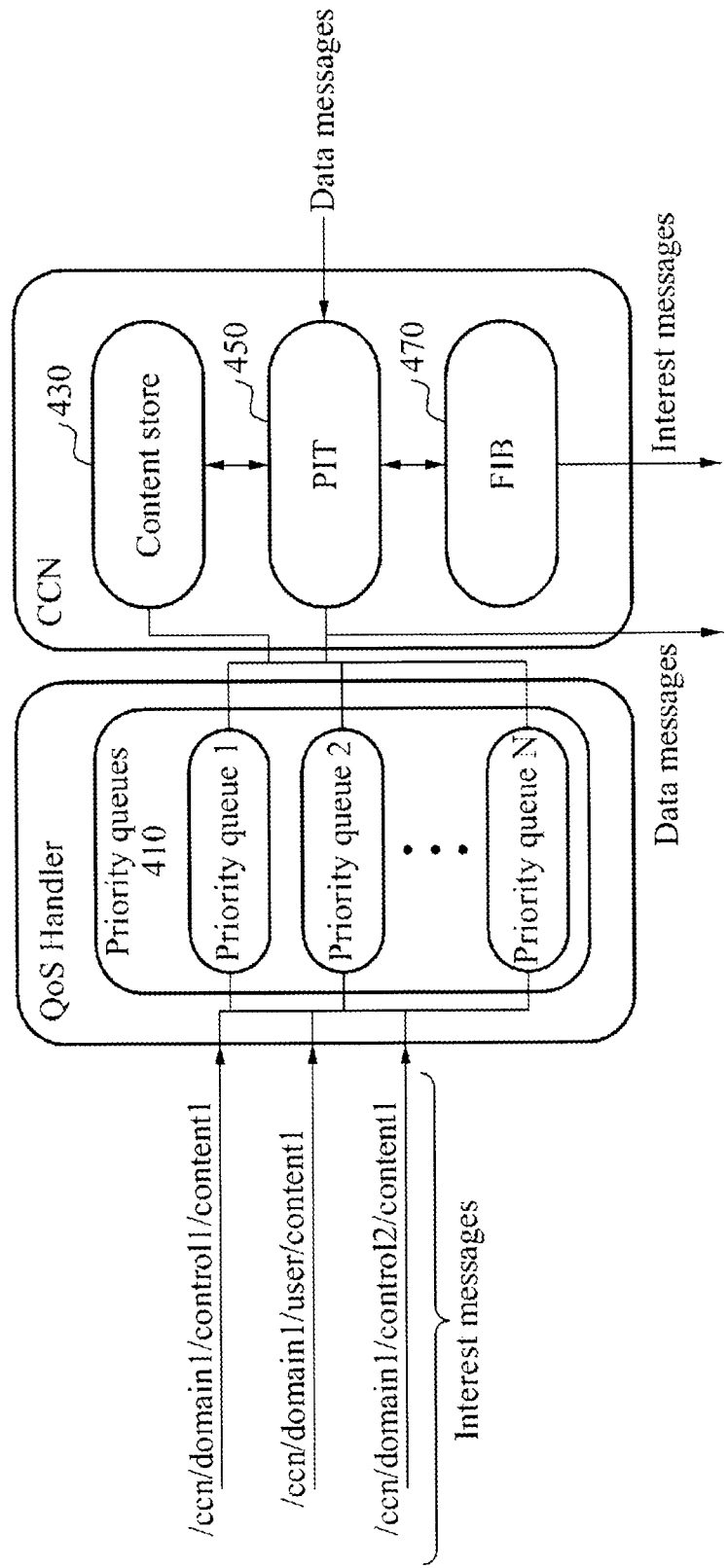
FIG. 4 is a diagram illustrating an example in which priority queues, which are located outside a node of a CCN, receive interest messages before a content store receives the interest messages.
Figure 5:
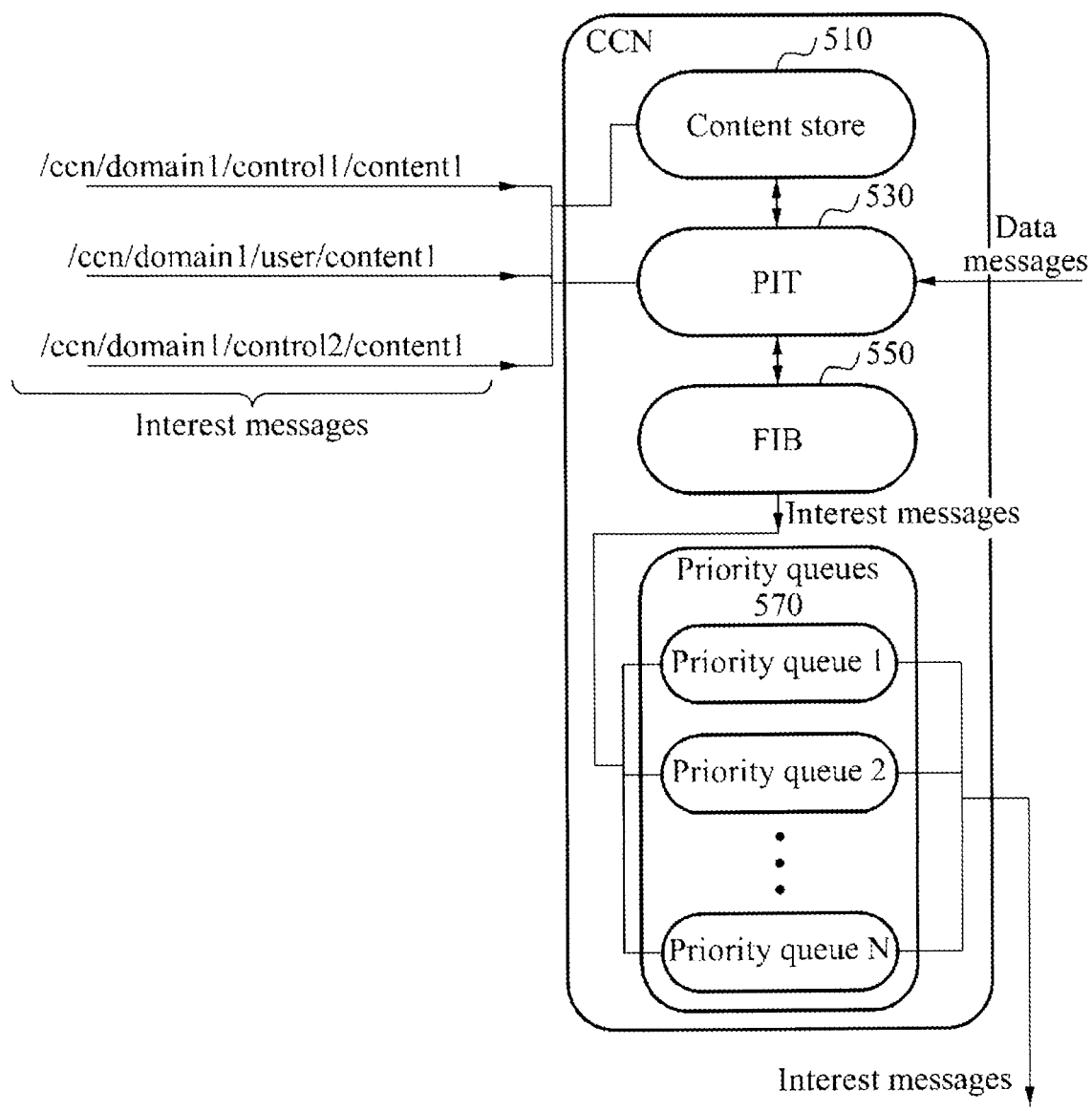
FIG. 5 is a diagram illustrating an example in which priority queues, which are located within a node, receive interest messages from a Forwarding Information Base (FIB) of a CCN.
Figure 6:
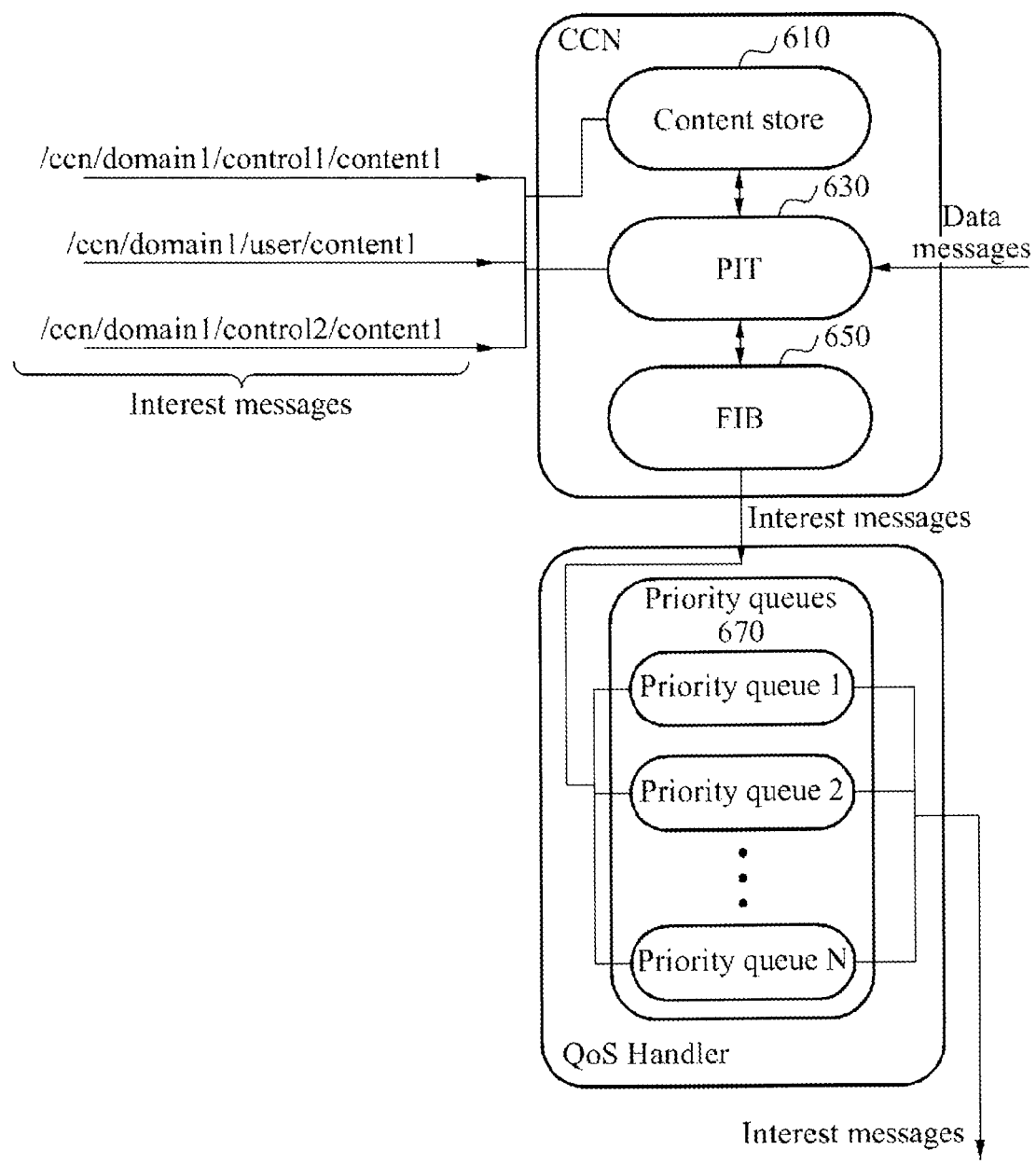
FIG. 6 is a diagram illustrating an example in which priority queues located outside a node receive interest messages from an FIB of a CCN.

The priority queues may be located within the node included in the CCN, as illustrated in FIGS. 3 and 5, or may be located separately from the node included in the CCN, as illustrated in FIGS. 4 and 6. Actual positions of priority queues are not necessarily limited by a predetermined processor or a constituent element.

In 209, the method performed at the node processes the interest messages in the priority queues based on the priorities of the interest messages. Prior to caching the contents in the content store, the method performed at the node processes the interest messages in the priority queues based on the priorities of the interest messages. For example, in 209, time-critical traffic, such as voice, may be mapped to a high priority queue. Best-effort traffic, such as a video file, may be mapped to a low priority queue. Additionally, a high priority queue may be serviced before a low priority queue is serviced because priorities are accurately determined during scheduling of queues. For example, another priority queue, such as weighted fair queuing, may exist.

In addition, an admission control mechanism to control accepting of packets based on Quality of Service (QoS) criteria may exist. In an example, when a packet is classified to be time critical, and when there is no available scheduling slot, the admission control may reject the packet.

In 211, the method performed at the node determines whether the contents corresponding to the interest messages are cached in the content store. In the determination of whether the contents are cached in the content store, the method sends the interest messages to the content store. In an example, in 211, when the contents are cached, in 213, the method performed at the node fetches the cached contents from the content store.

In another example, when the contents are cached in the content store, and when priority queues for prioritized data messages are determined to exist, in 215, the method determines priorities of data messages for the cached contents and transfers the data messages to the priority queues.

In 217, the method performed at the node generates data messages responding to the interest messages using the cached contents. The method also extracts a traffic type of each of the contents corresponding to the data messages from a content name of each of the contents.

In 215, if the method determines that the priority queues do not exist, in 223, the method transmits the data messages to a node that requests the contents, without further operation. In 219, the method performed at node determines priorities of the data messages based on the traffic type. In 221, the method processes the data messages in priority queues based on the priorities of the data messages. In 223, the method performed at the node transmits the data messages to the node that requested the contents.

When the contents are not cached in 211, in 225, the method performed at the node determines whether an entry for interest messages exists in a PIT. In an example, in 225, when the entry is determined to exist in the PIT, the method performed at the node proceeds to 227. In 227, the method adds to the entry in the PIT a face at which each of the interest messages arrives and the method ends.

In another example, in 225, when the entry is determined not to exist in the PIT, in 229, the method performed at the node generates a new entry in the PIT.

In 231, the method performed at the node forwards the interest messages to an FIB.

In 233, the method performed at the node determines whether priority queues for prioritized interest messages exist. As illustrated in FIGS. 5 and 6, the priority queues may be located after the FIB.

In an example, in 233, when the priority queues are determined not to exist, in 241, the method performed at the node may transmit the interest messages to corresponding faces. In another example, in 233, when the priority queues are determined to exist, the method terminates operation 231 and proceeds to perform operations 235 to 239. When operation 231 is terminated, in 235, the method performed at the node extracts a traffic type of each of the contents corresponding to the interest messages from a content name of each of the contents. To extract the traffic type, the node may use a classifier in a content name of each of the contents corresponding to the interest messages forwarded to the FIB.

In 237, the method performed at the node determines priorities of the interest messages, based on the traffic type.

In 239, the method performed at the node processes the interest messages in the priority queues based on the priorities of the interest messages.

In 241, the method performed at the node transmits interest messages to the corresponding faces.

FIG. 3 illustrates an example in which priority queues, which are located within a node of a CCN, receive interest messages before a content store receives the interest messages.

Priority queues used to prioritize interest messages may be located before a content store, as illustrated in FIGS. 3 and 4, or may be located after an FIB, as illustrated in FIGS. 5 and 6.

For example, when priority queues 310 are located before a content store 330 as illustrated in FIG. 3, the node included in the CCN extracts a traffic type of each of the contents from each content name included in each of a plurality of interest messages. The node also determines priorities of the interest messages and processes the interest messages based on the determined priorities.

For example, names of interest messages received by the node may be assumed to be '/ccn/domain1/control1/content1,' '/ccn/domain1/user/content1,' and '/ccn/domain1/control2/content1,' respectively. In this example, the node determines whether each of the interest messages is a control message required to be processed in preference to a user message, based on the names of the interest messages. Additionally, the node may extract a traffic type to determine whether a corresponding interest message is a first control message 'control1', or a second control message 'control2. In one example, the first control message may be processed with a first priority and the second control message may be processed with a second priority.

The node may determine priorities of the interest messages based on the traffic type, and may queue the interest messages in the priority queues 310 based on the priorities.

The interest messages queued in the priority queues 310 may be processed through the content store 330, a PIT 350, an FIB 370, and other similar structural elements, based on the priorities of the interest messages.

FIG. 4 illustrates an example in which priority queues, which are located outside a node of a CCN, receive interest messages before a content store receives the interest messages.

In FIG. 4, priority queues 410 are located outside the node of the CCN, unlike the priority queues 310 of FIG. 3 located within the node of the CCN. Additionally, a content store 430, a PIT 450, and an FIB 470 of FIG. 4 may perform the same operations as the content store 330, the PIT 350, and the FIB 370 of FIG. 3, respectively, and accordingly further description thereof will be omitted.

FIG. 5 illustrates an example in which priority queues, which are located within a node, receive interest messages from an FIB of a CCN. FIG. 6 illustrates an example in which priority queues, which are located outside a node, receive interest messages from an FIB of a CCN.

In one illustrative example, priority queues 570 of FIG. 5 and priority queues 670 of FIG. 6 may be located after an FIB 550 of FIG. 5 and an FIB 650 of FIG. 6, respectively.

An example in which the priority queues 570 and 670 are located in the FIBs 550 and 650, respectively, may be understood with reference to operations 233 through 241 of the method described in FIG. 2.

Figure 7:
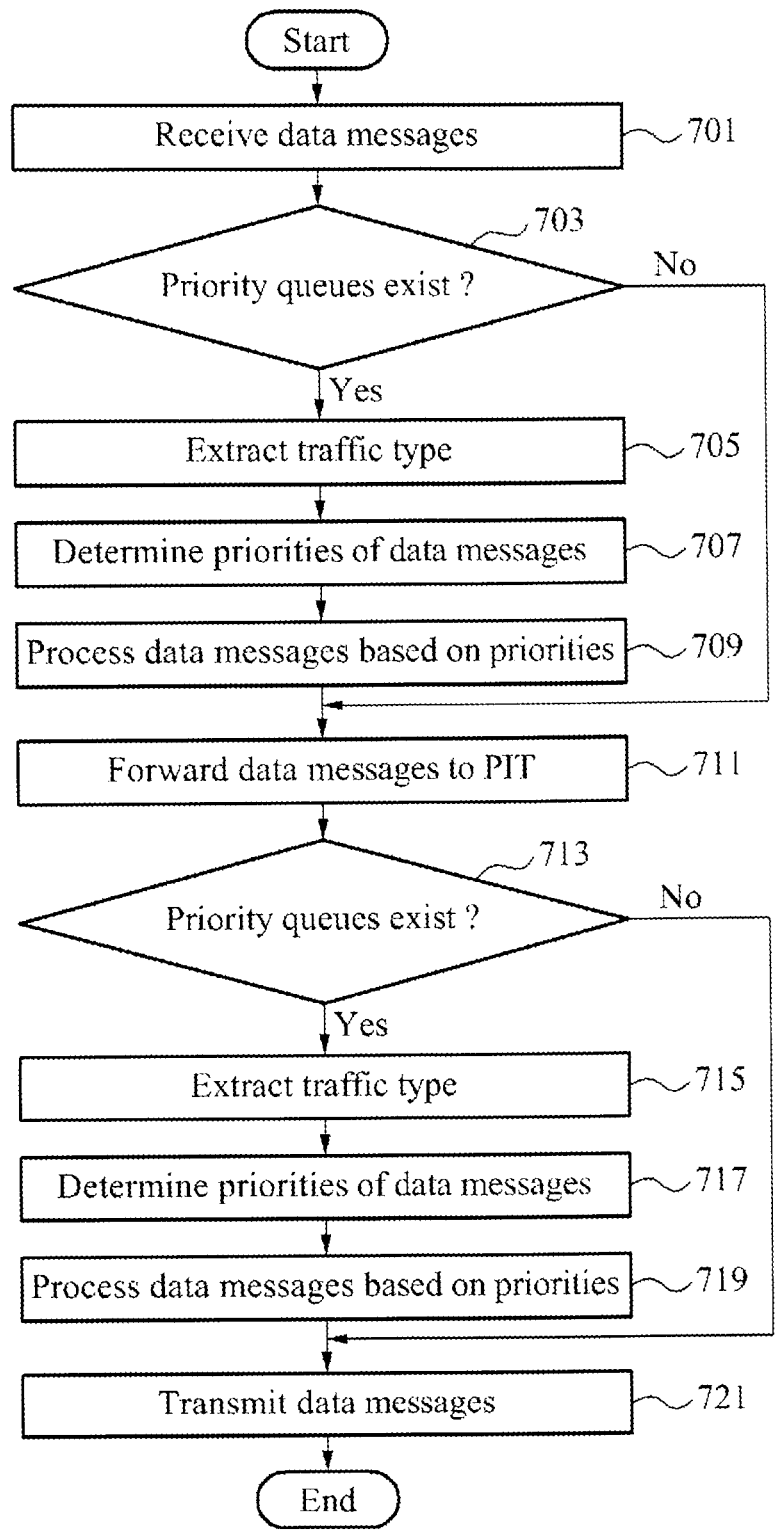
FIG. 7 is a flowchart illustrating an example of a method to process data messages based on priorities in a CCN.

FIG. 7 illustrates an example of a method to process data messages based on priorities in a CCN.

Referring to FIG. 7, in 701, the method receives a plurality of data messages that respond to a plurality of interest messages for requesting content.

In 703, the method determines whether priority queues used to prioritize the received data messages exist. In an example, in 703, when the priority queues are determined to exist, priorities of the data messages may be determined based on a combination of classifiers. Queuing of the data messages in the priority queues will be understood with reference to FIGS. 8 and 9.

In another example, in 703, when the priority queues are determined not to exist, the method may perform operation 711.

In 705, the method extracts a traffic type of each of the contents respectively corresponding to the data messages, from a content name of each of the content.

In 705, the priorities of the data messages may be determined based on a combination of classifiers, as described above. For example, a classifier may include at least one of a classifier for control data, a classifier for user data, a file extender, and a file service keyword.

In accordance with a pre-defined naming convention, control data may have a name, for example '/ccn/<domain1>/<control command marker>/domainInfo,' and user data may have a name, for example '/ccn/<domain1>/<voice>/CCN.x . . . . '

Additionally, the file extender may include, for example, JPG, MPEG, and the like, and the file service keyword may include, for example, an SIP.

In 707, the method determines the priorities of the data messages, based on the traffic type.

In 709, the method processes the data messages in the priority queues based on the priorities of the data messages.

In 709, the method processes the data messages, prior to forwarding the data messages to a PIT. The PIT may be used to look up a route in a reverse direction.

In 711, the method forwards the data messages to the PIT.

Figure 10:
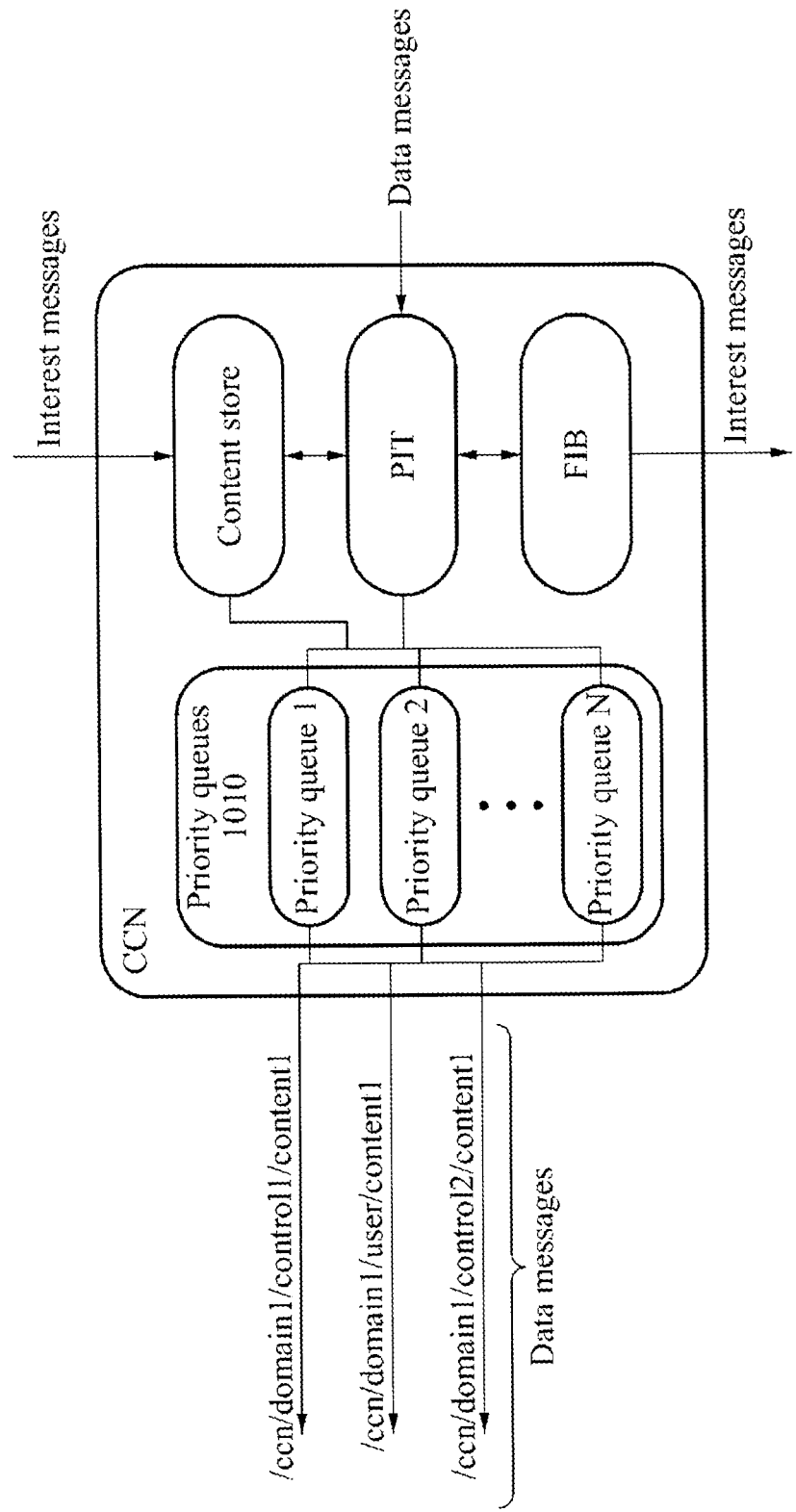
FIG. 10 is a diagram illustrating an example in which priority queues within a node of a CCN are operated when data messages are being transmitted.
Figure 11:
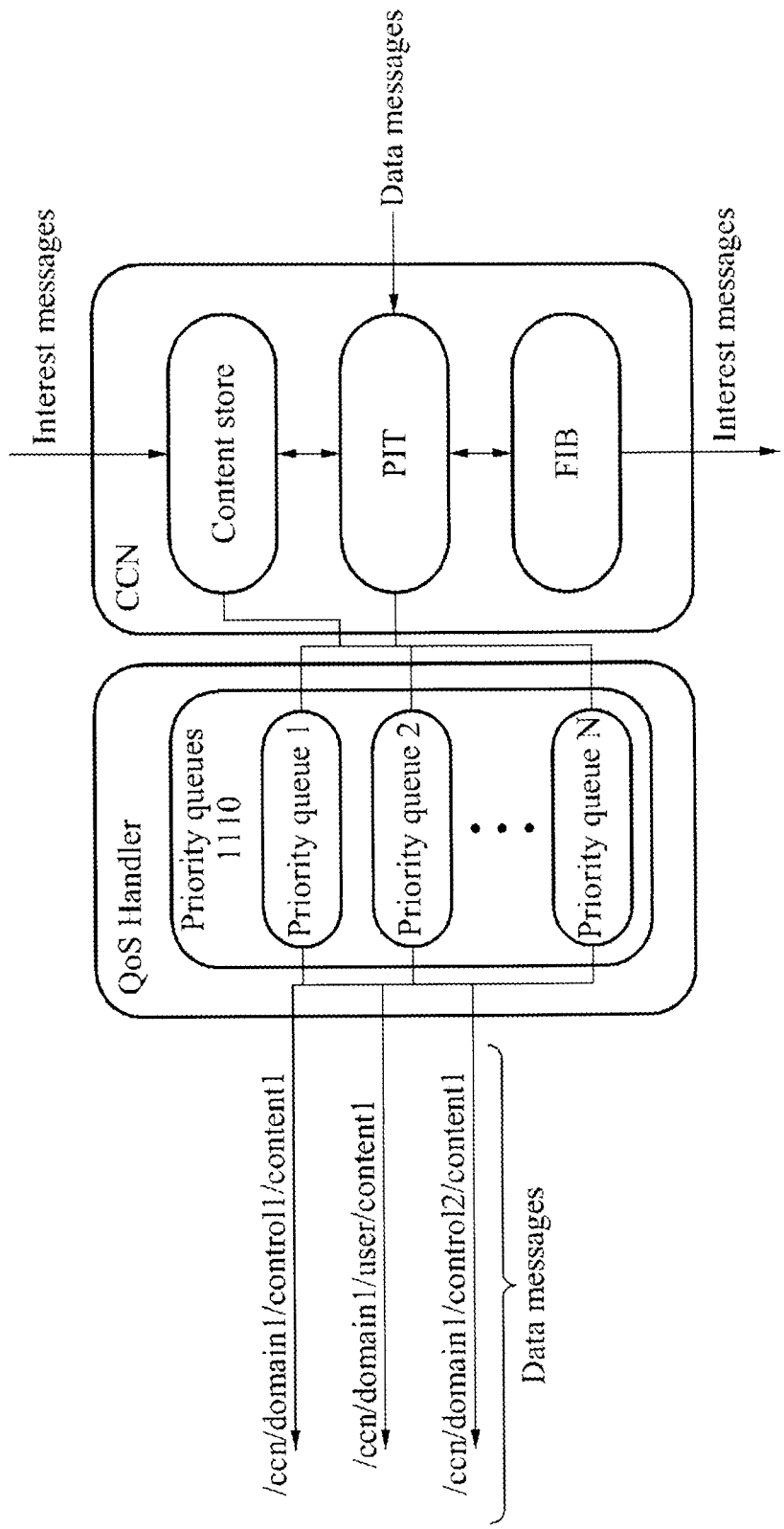
FIG. 11 is a diagram illustrating an example in which priority queues outside a node of a CCN are operated when data messages are being transmitted.

In 713, as illustrated in FIGS. 10 and 11, the method determines whether priority queues used to prioritize the data messages being forwarded exist.

In an example, in 713, when the priority queues are determined to exist, in 715, the method extracts from a content name of each of the contents a traffic type of each of the contents corresponding to the data messages.

In another example, in 713, when the priority queues are determined not to exist in 713, in 721, the method transmits the data messages to a node that requests the contents using the interest messages.

In 717, the method determines the priorities of the data messages based on the traffic type and stores the data messages in the priority queues.

In 719, the method processes the data messages in the priority queues based on the priorities of the data messages.

When the priority queues are determined not to exist in 713, in 721, the method transmits the data messages to a node that transmits corresponding interest messages.

Figure 8:
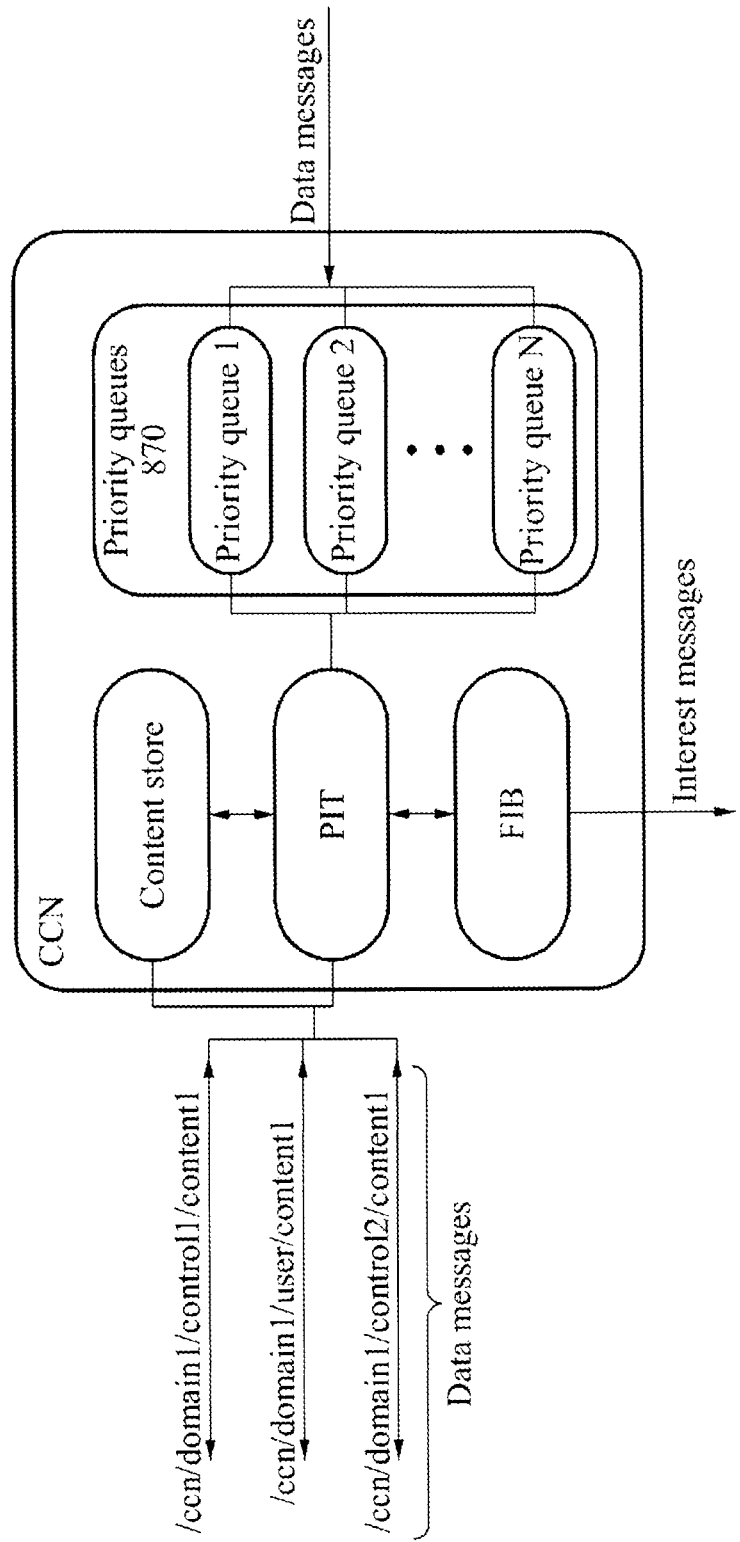
FIG. 8 is a diagram illustrating an example in which priority queues within a node of a CCN are operated when data messages are received.
Figure 9:
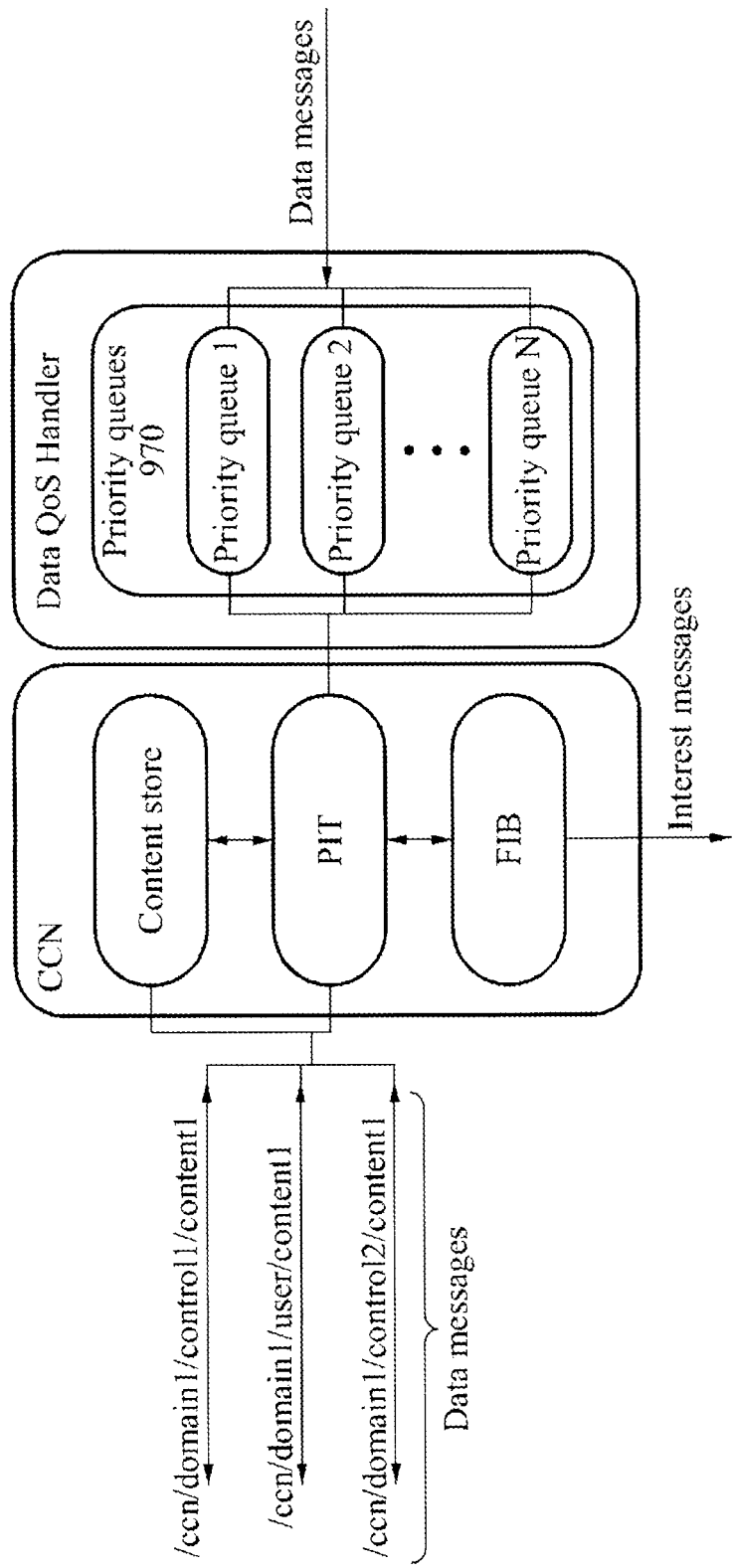
FIG. 9 is a diagram illustrating an example in which priority queues outside a node of a CCN are operated when data messages are received.

FIG. 8 illustrates an example in which priority queues 870, within a node of a CCN, are operated when data messages are received. FIG. 9 illustrates an example in which priority queues 970, outside a node of a CCN, are operated when data messages are received.

FIG. 10 illustrates an example in which priority queues 1010, within a node of a CCN, are operated when data messages are being transmitted. FIG. 11 illustrates an example in which priority queues 1110, outside a node of a CCN, are operated when data messages are being transmitted.

According to the illustrative examples described in FIGS. 1-11, it is possible to provide different QoS based on the type of contents, by extracting a traffic type of each of the contents from a content name of each of the contents.

Figure 12:
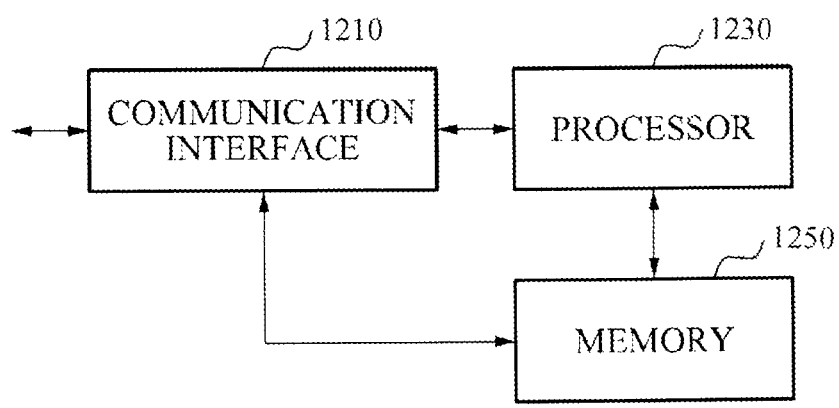
FIG. 12 is a block diagram illustrating an example of a content router configured to process interest messages and data messages based on priorities in a CCN.

FIG. 12 illustrates an example of a node configured to process interest messages at based on priorities in a CCN.

The node included in the CCN includes a communication interface 1210 receives the interest messages to request contents. The communication interface 1210 forwards the interest messages to the processor 1230 to determine whether priority queues used to prioritize the received interest messages exist. For example, when the priority queues are determined not to exist, the processor 1230 determines existence or nonexistence of cached contents in a memory 1250d.

The processor 1230 is configured to extract a traffic type of each of the contents that correspond to the interest messages, based on a content name of each of the contents. The processor 1230 extracts the traffic type of each of the contents using a classifier that may be included in the content name. The processor 1230 determines the priorities of the interest messages based on the traffic type. When the priorities of the interest messages are determined in the processor 1230, a memory 1250 stores interest messages in corresponding priority queues based on the determined priorities.

The processor 1230 processes the interest messages in the priority queues based on the priorities of the interest messages. Prior to caching the contents in the memory 1250, the processor 1230 processes the interest messages in the priority queues based on the priorities of the interest messages. Furthermore, the processor 1230 determines whether the contents corresponding to the interest messages are cached in the memory 1250. In the determination of whether the contents are cached in the memory 1250, the processor 1230 sends the interest messages to the memory 1250. In an example, when the contents are cached, in 213, the processor 1230 fetches the cached contents from the memory 1250.

In another example, when the contents are cached in the memory 1250, and when priority queues for prioritized data messages are determined to exist, the processor 1230 determines priorities of data messages for the cached contents and transmits the data messages to the priority queues.

The processor 1230 generates data messages responding to the interest messages using the cached contents and extracts a traffic type from each of the contents corresponding to the data messages based on a content name of each of the contents.

If the processor 1230 determines that the priority queues do not exist, the processor 1230 transmits the data messages through the communication interface 1210 to a node that requests the contents. The processor 1230 determines priorities of the data messages based on the traffic type.

As a result of the determination, the processor 1230 processes the data messages in priority queues based on the priorities of the data messages. Through the communication interface 1210, the processor 1230 transmits the data messages to the node that requested the contents.

When the contents are not cached, the processor 1230 determines whether an entry for interest messages exists in a PIT. When the entry is determined to exist in the PIT, the processor 1230 adds to the entry in the PIT a face at which each of the interest messages arrives. In another example, when the entry is determined not to exist in the PIT, the processor 1230 generates a new entry in the PIT.

The processor 1230 forwards the interest messages to an FIB and determines whether priority queues for prioritized interest messages exist. In an example, when the priority queues are determined not to exist, the processor 1230 may transmit the interest messages to corresponding faces. In another example, when the priority queues are determined to exist, the processor 1230 extracts a traffic type of each of the contents corresponding to the interest messages from a content name of each of the contents. To extract the traffic type, the processor 1230 may use a classifier in a content name of each of the contents corresponding to the interest messages forwarded to the FIB.

The processor 1230 determines priorities of the interest messages, based on the traffic type. The processor 1230 processes the interest messages in the priority queues based on the priorities of the interest messages. The processor 1230 transmits interest messages to the corresponding faces through the communication interface 1210.

In an alternative configuration, the node in the CCN of FIG. 12 may be also be configured to receive at the communication interface 1210 a plurality of data messages that respond to a plurality of interest messages for requesting content.

The processor 1230 determines whether priority queues used to prioritize the received data messages exist. In an example, when the priority queues are determined to exist, the processor 1230 determines priorities of the data messages based on a combination of classifiers.

The processor 1230 extracts a traffic type of each of the contents corresponding to the data messages, from a content name of each of the content.

The priorities of the data messages may be determined based on a combination of classifiers. For example, a classifier may include at least one of a classifier for control data, a classifier for user data, a file extender, and a file service keyword.

The processor 1230 determines the priorities of the data messages based on the traffic type. The processor 1230 further processes the data messages in the priority queues based on the priorities of the data messages. Also, the processor 1230 processes the data messages prior to forwarding the data messages to a PIT. The PIT may be used to look up a route in a reverse direction. The processor 1230 forwards the data messages to the PIT and determines whether priority queues used to prioritize the data messages being forwarded exist.

In an example, when the priority queues are determined to exist, the processor 1230 extracts from a content name of each of the contents a traffic type of each content corresponding to the data messages.

In another example, when the priority queues are determined not to exist, the processor 1230 transmits the data messages to a node that requests the contents using the interest messages.

The processor 1230 determines the priorities of the data messages based on the traffic type. The memory 1250 stores the data messages in the priority queues. The processor 1230 processes the data messages in the priority queues based on the priorities of the data messages.

When the priority queues are determined not to exist, the processor 1230 transmits the data messages through the communication interface 1210 to a node that transmits corresponding interest messages.

The processor 1230 and the memory 1250, each may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processor 1230 and the memory 1250, each may run an operating system (OS) and one or more software applications that run on the OS. The processing device also may access, store, manipulate, process, and create data in response to execution of the software. For purpose of simplicity, the description of the processor 1230 and the memory 1250, each is used as singular; however, one skilled in the art will appreciated that a processing device may include multiple processing elements and multiple types of processing elements. For example, the processor 1230 and the memory 1250, each may include multiple processors or a processor and a controller. In addition, different processing configurations are possible, such a parallel processors.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

It is to be understood that in the embodiment of the present invention, the operations in FIGS. 2 and 7 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions to perform at least the method described in FIGS. 2 and 7.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for processing interest messages, the method comprising:
   receiving interest messages in a content-centric network (CCN) of computers, the interest messages comprising requests for contents;
   extracting, by a processor, a traffic type from each content that corresponds to an interest message, by using a classifier included in a content name of each content that corresponds to an interest message, and by using preset traffic types in the CCN, wherein the preset traffic types in the CCN comprise a time critical traffic and a best-effort traffic, and wherein a priority of time critical traffic is higher than a priority of best-effort traffic;
   determining priorities of the interest messages, based on the traffic type of each interest message;
   storing the interest messages in corresponding priority queues, based on the determined priorities; and
   processing, by the processor, interest messages in the priority queues, based on the priorities of the interest messages.

2. The method of claim 1, wherein the processing comprises:
   cache the contents in a content store, after processing the interest messages in the priority queues.

3. The method of claim 1, further comprising:
   configuring the classifier to comprise at least one of a classifier for control data, a classifier for user data, a file extender, and a file service keyword.

4. The method of claim 1, further comprising:
   determining whether the contents that correspond to the interest messages are cached in the content store.

5. The method of claim 4, further comprising, when the contents are determined to be cached:
   generating data messages by using the cached contents, the data messages responding to the interest messages;
   extracting, by a processor, the traffic type from each content that corresponds to a data message, based on the content name of each content that corresponds to a data message;
   determining priorities of the data messages, based on the traffic type of each data message; and
   storing the data messages in corresponding priority queues, based on the determined priorities.

6. The method of claim 4, further comprising:
   when the contents are determined not to be cached, forwarding the interest messages to a forwarding information base (FIB), wherein the FIB is configured to store an entry associated with the contents; and
   wherein the extracting by the processor comprises extracting the traffic type from each content that corresponds to an interest message, based on the content name of each content that corresponds to an interest message, when the forwarding of the interest messages to the FIB is terminated.

7. The method of claim 6, wherein the extracting by the processor comprises extracting the traffic type from each content that corresponds to an interest message, by using a classifier included in a content name of each content that corresponds to the interest messages forwarded to the FIB.

8. A method for processing data messages, the method comprising:
  receiving data messages responding to interest messages in a content-centric network (CCN) of computers, the interest messages comprising requests for contents;
  extracting, by a processor, a traffic type from each content that corresponds to a data message, by using a classifier included in a content name of each content that corresponds to a data message, and by using preset traffic types in the CCN, wherein the preset traffic types in the CCN comprise a time critical traffic and a best-effort traffic, and wherein a priority of time critical traffic is higher than a priority of best-effort traffic;
  determining priorities of the data messages, based on the traffic type of each data message;
  storing the data messages in corresponding priority queues, based on the determined priorities; and
  processing, by the processor, data messages in the priority queues, based on the priorities of the data messages.

9. The method of claim 8, wherein the processing comprises:
  forwarding the data messages to a pending interest table (PIT) after processing the data messages, wherein the PIT is used to look up a route in a reverse direction.

10. The method of claim 8, wherein the extracting by the processor comprises:
  extracting the traffic type from each content, after the data messages are forwarded to the PIT.

11. The method of claim 8, further comprising:
  configuring the classifier to comprise at least one of a classifier for control data, a classifier for user data, a file extender, and a file service keyword.

12. A non-transitory computer readable recording medium storing a program to cause a computer to implement the method of claim 8.

13. An apparatus configured to process interest messages in a content-centric network (CCN) of computers, the apparatus comprising:
  a communication interface configured to receive interest messages in a content-centric network (CCN) of computers, the interest messages comprising requests for contents; and
  a processor, configured to
    extract a traffic type from each content that corresponds to an interest message, by using a classifier included in a content name of each content that corresponds to an interest message, and by using preset traffic types in the CCN, wherein the preset traffic types in the CCN comprise a time critical traffic and a best-effort traffic, and wherein a priority of time critical traffic is higher than a priority of best-effort traffic;
    determine priorities of the interest messages, based on the traffic type of each interest message,
    store the interest messages in corresponding priority queues, based on the determined priorities, and
    process interest messages in the priority queues, based on the priorities of the interest messages.

14. The apparatus of claim 13, wherein the processor is further configured to cache the contents in a memory, after processing the interest messages in the priority queues.

15. The apparatus of claim 13, wherein the classifier comprises at least one of a classifier for control data, a classifier for user data, a file extender, and a file service keyword.

16. The apparatus of claim 13, wherein the processor is further configured to determine whether the contents that correspond to the interest messages are cached in a memory.

17. The apparatus of claim 16, wherein when the contents are determined to be cached, the processor is further configured to
  generate data messages by using the cached contents, wherein the data messages respond to the interest messages,
  extract the traffic type from each content that corresponds to a data message, based on the content name of each content that corresponds to a data message,
  determine priorities of the data messages, based on the traffic type of each data message,
  store the data messages in corresponding priority queues, based on the determined priorities, and
  process data messages in the priority queues, based on the priorities of the data messages.

18. The apparatus of claim 16,
  wherein when the contents are determined not to be cached, the processor is further configured to forward the interest messages to a forwarding information base (FIB), wherein the FIB is configured to store an entry associated with the contents, and
  wherein when the forwarding of the interest messages to the FIB is terminated, the processor is further configured to extract the traffic type from each content that corresponds to an interest message, based on the content name of each content that corresponds to an interest message.

19. The apparatus of claim 18, wherein the processor is further configured to extract the traffic type from each content that corresponds to an interest message, by using a classifier included in a content name of each content that corresponds to the interest messages forwarded to the FIB.

* * * * *